US012613432B2

(12) United States Patent
Cheung et al.

(10) Patent No.: US 12,613,432 B2
(45) Date of Patent: Apr. 28, 2026

(54) RING FOCUS SPECTACLE LENS FOR CONTROLLING MYOPIA PROGRESSION, AND MANUFACTURING METHOD THEREFOR

(71) Applicant: THE HONG KONG POLYTECHNIC UNIVERSITY, Hong Kong (CN)

(72) Inventors: Chi Fai Cheung, Hong Kong (CN); Bo Wang, Hong Kong (CN); Chi-Ho To, Hong Kong (CN); Tze Man Leung, Hong Kong (CN); Lai Ting Ho, Hong Kong (CN); Ka Chun Cheung, Hong Kong (CN); Cheuk Ming Wong, Hong Kong (CN); Ching Hang Wong, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 342 days.

(21) Appl. No.: 18/580,776

(22) PCT Filed: Mar. 7, 2022

(86) PCT No.: PCT/CN2022/079507
§ 371 (c)(1),
(2) Date: Jan. 19, 2024

(87) PCT Pub. No.: WO2023/005211
PCT Pub. Date: Feb. 2, 2023

(65) Prior Publication Data
US 2025/0085571 A1 Mar. 13, 2025

(30) Foreign Application Priority Data
Jul. 28, 2021 (HK) ........................... 32021035686.3

(51) Int. Cl.
G02C 7/06 (2006.01)
B29D 11/00 (2006.01)
G02C 7/02 (2006.01)

(52) U.S. Cl.
CPC .......... *G02C 7/066* (2013.01); *B29D 11/0048* (2013.01); *G02C 7/024* (2013.01); *G02C 2202/24* (2013.01)

(58) Field of Classification Search
None
See application file for complete search history.

(56) References Cited

U.S. PATENT DOCUMENTS 6,451,227 B1 9/2002 Greshes
2014/0375949 A1* 12/2014 Buehren ................ G02C 7/027
351/159.05
(Continued)

FOREIGN PATENT DOCUMENTS

CN 101675372 A 3/2010
CN 110068937 A 7/2019
(Continued)

OTHER PUBLICATIONS

Notice of Reasons for Refusal of Japanese Patent No. 2024-504238 issued from the Japan Patent Office on Oct. 24, 2025.
(Continued)

*Primary Examiner* — Darryl J Collins
(74) *Attorney, Agent, or Firm* — S&F/WEHRW

(57) ABSTRACT

A ring focus spectacle lens (1) for controlling the progression of myopia, and a manufacturing method therefor. The ring focus spectacle lens (1) can provide clear vision for a patient, and also has a plurality of ring-shaped defocusing zones to provide an optical defocusing effect. Since there is no joint between successive concentric rings of different optical powers that are tangent to each other, the ring focus
(Continued)

spectacle lens (1) is as aesthetic as a common spectacle lens. In the manufacturing method, three front mold cores (71), a rear mold core (72), and a planar rear mold core are used to manufacture a series of ring focus spectacle lenses (1) having different powers, thereby reducing the number of mold cores and the production cost. In addition, for the requirements of individuals with severe myopia and astigmatism, a semi-finished lens is provided by means of the manufacturing method, which not only greatly reduces the number of mold cores, but also reduces the inventory quantity of desired lenses, thereby reducing costs.

21 Claims, 6 Drawing Sheets

(56)                    References Cited

U.S. PATENT DOCUMENTS

| | | | | |
|---|---|---|---|---|
| 2021/0055573 A1* | 2/2021 | Back | ...................... | G02C 7/042 |
| 2022/0404639 A1* | 12/2022 | Lam | ...................... | G02C 7/044 |
| 2023/0020067 A1* | 1/2023 | Qi | ............................ | G02B 1/14 |
| 2023/0273458 A1* | 8/2023 | Qi | ............................ | G02C 7/06 |
| | | | | 351/159.74 |
| 2023/0296917 A1* | 9/2023 | Braunger | ......... | B29D 11/00326 |
| | | | | 351/159.41 |

FOREIGN PATENT DOCUMENTS

| | | | |
|---|---|---|---|
| CN | 217982048 | U | 12/2022 |
| JP | 2009540373 | A | 11/2009 |
| JP | 2013537317 | A | 9/2013 |
| JP | 2016090902 | A | 5/2016 |
| TW | 201344282 | A | 11/2013 |

OTHER PUBLICATIONS

Final Office Action; Application No. or Patent No. 2022105056703 issued from the China National Intellectual Property Administration on Oct. 12, 2024.

Second Office Action; Application No. 2022105056703 issued from the China National Intellectual Property Administration on Mar. 11, 2025.

* cited by examiner

RING FOCUS SPECTACLE LENS FOR CONTROLLING MYOPIA PROGRESSION, AND MANUFACTURING METHOD THEREFOR

TECHNICAL FIELD

The present invention relates to spectacle lenses, in particular to a ring-focus spectacle lens for controlling myopia progression, and manufacturing method therefor.

BACKGROUND

Myopia is a common eye disease. Myopia is mainly caused by the excessive elongation of the eyeball, which makes the focal plane of a distant object fall in front of the retina, resulting in blurred vision in the distance. According to a study, by 2050, more than 50% of the global population will be myopic. In order to find effective intervention measures to control the development of myopia, scholars in related fields have done a lot of research. At present, there are three mainstream manners, including 1) atropine eye drops; 2) "OK lens" that change the radians of the cornea; 3) defocus lens that blurs the peripheral vision. The higher the concentration of atropine, the better the effect, but the side effects are also obvious: pupil enlargement, photophobia, difficulty in near vision, allergies, and the higher the concentration, the more obvious the myopia rebound, etc. Even low-concentration atropine needs to be used under close follow-up monitoring, and the security is difficult to guarantee. Orthokeratology lenses, commonly known as "OK lenses", are rigid contact lenses that are worn at night while sleeping. The principle is that through the contact between the lens and the cornea, pressure is used to change the cornea to the ideal radians. Patients need to wear it every night to maintain a stable curative effect. Once it is stopped, it will rebound. In addition, if the hygiene of the lens is not handled properly, it will increase the risk of infection or scratching the cornea. Defocus lens uses optical technology to deviate the focus around the lens, which blurs the peripheral vision and helps to inhibit the elongation of the eyeball. However, due to the blurred peripheral vision, it is easy to trip, so one needs to be especially careful when walking and going up and down the stairs.

A recent randomized clinical study conducted by a research team of the School of Optometry of the Hong Kong Polytechnic University shows that myopia of primary and secondary school students wearing defocusing incorporated soft contact lenses (DISC) has progressed more slowly in recent two years compared to children using monofocal contact lenses. When primary school students wear DISC lenses for 8 hours every day, the progression of myopia is slowed by 60%. The DISC lens provides patients with clear vision through the design of alternating concentric rings with different optical powers, and at the same time, it enables patients to continuously receive positive defocus signals at various visual distances to inhibit eyeball elongation. Although DISC lens has a positive effect on myopia control, as a kind of contact lenses, it is essentially invasive. Due to eye health problems, a large number of primary and secondary school students cannot wear soft contact lenses. For example, they may have lens intolerance issues or safety concerns, which may limit their wearing time.

The spectacle lens that incorporates defocusing function is very attractive and acceptable to all patients, because it is essentially non-invasive as traditional spectacle lens, and easy to wear and very safe. At the same time, the spectacle lens can maximize the wearing time, so as to achieve the best myopia control. However, simply transferring the design concept of concentric ring of DISC lens to spectacle lens will cause many problems. In particular, concentric rings with different optical powers will occur obvious joints at the joint position, for contact lenses. These joints will not be easily observed in appearance due to the influence of tears. However, when the joint appears on the spectacle lens, the appearance will be very obvious, which will seriously affect the aesthetics and reduce the patient's willingness to wear it.

SUMMARY OF THE INVENTION

The present invention discloses a ring-focus spectacle lens for controlling myopia progression, and manufacturing method therefor. This ring-focus spectacle lens can provide clear vision for patients, and also has a plurality of annular defocusing zones to form an optical defocus effect. Since this ring-focus spectacle lens has no joint between concentric rings with different optical powers, this ring-focus spectacle lens is as aesthetic as an ordinary spectacle lens. This manufacturing method can use three anterior mold cores, a set of posterior mold cores and a planar posterior mold core to manufacture a series of ring-focus spectacle lenses with full degrees, thereby reducing the number of mold cores and the production cost. At the same time, this manufacturing method provides a semi-finished lens/lenses to manufacture a ring-focus spectacle lens with high myopia degree and high astigmatism degree. Since the market demand for high myopia degree and high astigmatism degree is small, it is not cost-effective to use a separate mold core. Using this post-processing manner of semi-finished lenses not only greatly reduces the number of mold cores, but also reduces the inventory number of required lenses, thereby reducing the cost.

Some embodiments of the present invention disclose a ring-focus spectacle lens for controlling myopia progression, which comprises a convex front surface, a concave rear surface, a plurality of correction zones for imaging light on a retina, and a plurality of astigmatism zones for imaging light in front of the retina. The optical centers of the front surface and the rear surface are located on a same optical axis. The correction zones have a first refractive power, and the astigmatism zones have a second refractive power which is greater than the first refractive power. The correction zones and the astigmatism zones are arranged in a staggered way in the ring-focus spectacle lens, wherein the front surface comprises a free-form surface composed of a plurality of first curved surfaces and a plurality of second curved surfaces. The plurality of first curved surfaces have a same radius of curvature, and the plurality of second curved surfaces have a same or different radius of curvature. The radius of curvature of the first curved surfaces is greater than that of the second curved surfaces. The first curved surfaces and the second curved surfaces are joined in a staggered way in the free-form surface. The correction zone is defined at least by the first curved surfaces, and the astigmatism zone is defined at least by the second curved surfaces. And wherein the first curved surface and the adjacent second curved surface are joined in a tangent and continuous manner or a transitional curved surface manner. For the tangent and continuous manner, the first curved surface and the adjacent second curved surface are tangent and continuous, so that the endpoint of the first curved surface and the endpoint of the second curved surface coincide at the joint point, and the tangent of the first curved surface and the tangent of the second curved surface have the same slope at the joint point. The extension line of the connecting line connecting the center of the first curved surface and the center of the second curved surface passes through the joint point. For the transitional curved surface manner, a transition curved surface is provided between the first curved surface and the adjacent second curved surface. The starting point and the ending point of the transition curved surface are respectively joined with the ending point of the first curved surface and the starting point of adjacent second curved surface. Directions and values of curvatures of the first curved surface and the transition curved surface are the same at the joint point of the first curved surface and the transition curved surface. Directions and values of curvatures of the second curved surface and the transition curved surface are the same at the joint point of the second curved surface and the transition curved surface, and the curvature on the transition curved surface changes continuously.

According to some embodiments, from the center of the lens outward in the radial direction, when the diopter of a previous curved surface minus the diopter of a subsequent curved surface is less than or equal to a threshold, the previous curved surface and the subsequent curved surface are joined in the tangent and continuous manner. When the diopter of the previous curved surface minus the diopter of the subsequent curved surface is greater than a threshold, the previous curved surface and the subsequent curved surface are joined in the transitional curved surface manner.

According to some embodiments, the threshold is 3.5D.

According to some embodiments, all first curved surfaces and second curved surfaces adjacent to each other are joined in the tangent and continuous manner.

According to some embodiments, the free-form surface is formed by a generatrix revolving along the optical axis, and the generatrix is composed of a plurality of first curves and a plurality of second curves. Each first curve has a radius of curvature of the first curved surface and each second curve has a radius of curvature of the second curved surface. The first curves and the second curves are joined in a staggered way in the generatrix. The first curves revolve to form the first curved surface, and the second curves revolve to form the second curved surface.

According to some embodiments, the radius of curvatures of the plurality of second curved surfaces is constant or increases in the radial direction of the ring-focus spectacle lens.

According to some embodiments, the second refractive power is greater than the first refractive power by 0.5D to 5D.

According to some embodiments, when the first refractive power is between −2D and 0D, the correction zone bending of the front surface is 401-600 bends.

According to some embodiments, when the first refractive power is between −4D and −2D, the correction zone bending of the front surface is 201-400 bends.

According to some embodiments, when the first refractive power is between −6D and −4D, the correction zone bending of the front surface is 50-200 bends.

According to some embodiments, the rear surface is a spherical surface, an even aspheric surface or a biconical surface.

According to some embodiments, the plurality of correction zones include a correction central zone and a plurality of correction concentric rings, wherein the correction central zone is located at the center of a ring-focus spectacle lens, and the plurality of astigmatism zones comprise a plurality of astigmatism concentric rings, and the correction concentric rings and the astigmatism concentric rings are arranged in a staggered way.

According to some embodiments, the diameter of the correction central zone is 5-12 mm, the width of the correction concentric ring is 0.5-2 mm, and the width of the astigmatism concentric ring is 0.5-2 mm.

According to some embodiments, the plurality of astigmatism zones have 5-15 astigmatism concentric rings, and the plurality of correction zones include 5-15 correction concentric rings.

According to some embodiments, the central thickness of the ring-focus spectacle lens is 1-3 mm, and the diameter of the ring-focus spectacle lens is 60-80 mm.

Some embodiments of the present invention disclose a method for manufacturing a series of the ring-focus spectacle lenses, the series of the ring-focus spectacle lenses include a first set of ring-focus spectacle lenses with different myopia degree and astigmatism degree, a second set of ring-focus spectacle lenses with different myopia degree and astigmatism degree, a third set of ring-focus spectacle lenses with different myopia degree and astigmatism degree, and a fourth set of ring-focus spectacle lenses with different myopia degree and astigmatism degree, wherein the myopia degree of the first set of ring-focus spectacle lenses is smaller than that of the second set of ring-focus spectacle lenses, the myopia degree of the second set of ring-focus spectacle lenses is smaller than that of the third set of ring-focus spectacle lenses, and the myopia degree of the third set of ring-focus spectacle lenses is smaller than that of the fourth set of ring-focus spectacle lenses, the method comprises the following steps:

providing a first anterior mold core for generating a front surface with a first correction zone bending;

providing a second anterior mold core for generating a front surface with a second correction zone bending, wherein the first correction zone bending is greater than the second correction zone bending;

providing a third anterior mold core for generating a front surface with a third correction zone bending, wherein the second correction zone bending is greater than the third correction zone bending;

providing a set of posterior mold cores for generating rear surfaces with different radius of curvature, the set of posterior mold cores comprising a plurality of posterior mold cores, each posterior mold core being used for generating rear surfaces with corresponding radius of curvature;

providing a planar posterior mold core for generating a planar rear surface;

using the first anterior mold core and the set of posterior mold cores to generate the first set of ring-focus spectacle lenses;

using the second anterior mold core and the set of posterior mold cores to generate the second set of ring-focus spectacle lenses;

using the third anterior mold core and the set of posterior mold cores to generate the third set of ring-focus spectacle lenses;

using the third anterior mold core and the planar posterior mold core to generate a semi-finished lens; and processing the rear surface of the semi-finished lens to generate the fourth set of ring-focus spectacle lenses.

According to some embodiments, wherein the first set of ring-focus spectacle lenses have ring-focus spectacle lenses with a first refractive power of −2D to 0D, the second set of ring-focus spectacle lenses have ring-focus spectacle lenses with a first refractive power of –4D to –2D, the third set of ring-focus spectacle lenses have ring-focus spectacle lenses with a first refractive power of –6D to –4D, and the fourth set of ring-focus spectacle lenses have ring-focus spectacle lenses with a first refractive power of less than –6D or an astigmatism degree less than –2D.

According to some embodiments, the first correction zone bending is 401-600 bends, the second correction zone bending is 201-400 bends, and the third correction zone bending is 50-200 bends.

According to some embodiments, the set of posterior mold cores have 80 to 120 posterior mold cores.

According to some embodiments, the central thickness of the semi-finished lens is 2-20 mm.

DETAILED DESCRIPTION

Figure 1:
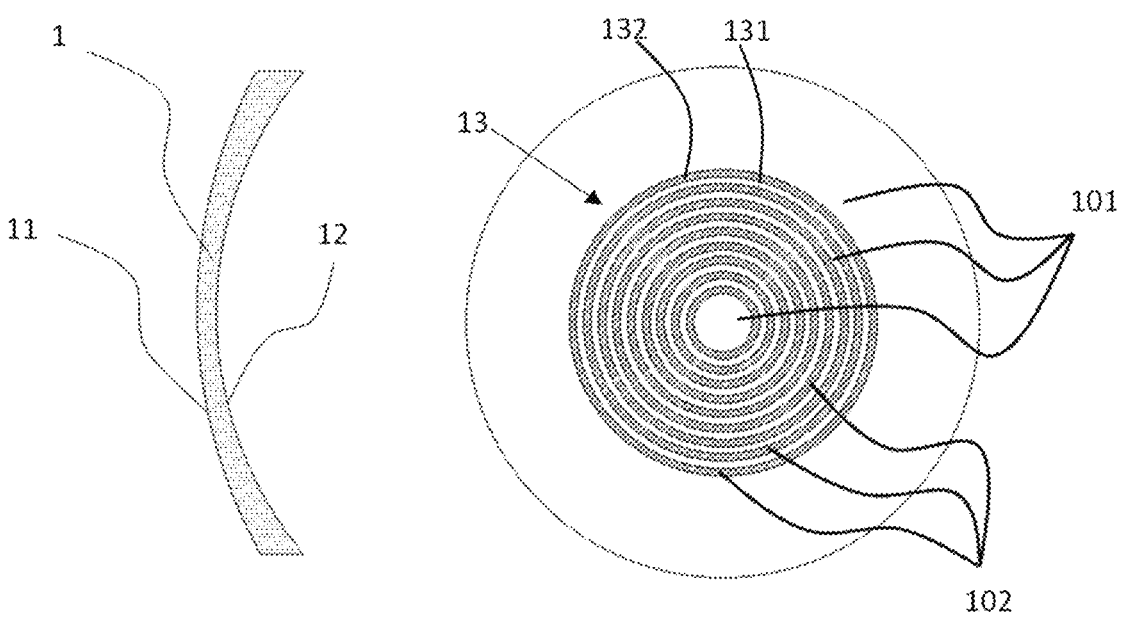
FIG. 1 is a schematic structural diagram of a ring-focus spectacle lens according to embodiments of the present invention.

Specific implementations of the present invention will be described below with reference to the accompanying drawings and embodiments.

Some embodiments of the present invention disclose a ring-focus spectacle lens for controlling myopia progression, which comprises a convex front surface, a concave rear surface, a plurality of correction zones for imaging light on the retina, and a plurality of astigmatism zones for imaging light in front of the retina. The optical centers of the front surface and the rear surface are located on a same optical axis. The correction zones have a first refractive power, and the astigmatism zones have a second refractive power which is greater than the first refractive power. The correction zones and the astigmatism zones are arranged in a staggered way in the ring-focus spectacle lens. Wherein the front surface comprises a free-form surface composed of a plurality of first curved surfaces and a plurality of second curved surfaces. The first curved surfaces have a same radius of curvature, and the second curved surfaces have a same or different radius of curvature. The radius of curvature of the first curved surfaces is greater than that of the second curved surfaces. The first curved surfaces and the second curved surfaces are joined in a staggered way in the free-form surface. The correction zone is defined at least by the first curved surfaces, and the astigmatism zone is defined at least by the second curved surfaces. And wherein the first curved surface and the adjacent second curved surface are joined in a tangent and continuous manner or a transitional curved surface manner. For the tangent and continuous manner, the first curved surface and the adjacent second curved surface are tangent and continuous, such that an endpoint of the first curved surface and an endpoint of the second curved surface coincide at a joint point, and the tangent of the first curved surface and the tangent of the second curved surface have a same slope at the joint point. An extension line of a connecting line connecting a center of the first curved surface and a center of the second curved surface passes through the joint point. For the transitional curved surface manner, a transition curved surface is provided between the first curved surface and the adjacent second curved surface, and a starting point and an ending point of the transition curved surface are respectively joined with an ending point of the first curved surface and a starting point of the adjacent second curved surface, directions and values of curvatures of the first curved surface and the transition curved surface are the same at the joint point of the first curved surface and the transition curved surface, and directions and values of curvatures of the second curved surface and the transition curved surface are the same at the joint point of the second curved surface and the transition curved surface, and the curvature on the transition curved surface changes continuously.

According to some embodiments, from a center of the lens outward in a radial direction, when the diopter of a previous curved surface minus the diopter of a subsequent curved surface is less than or equal to a threshold, the previous curved surface and the subsequent curved surface are joined in the tangent and continuous manner. When the diopter of the previous curved surface minus the diopter of the subsequent curved surface is greater than a threshold, the previous curved surface and the subsequent curved surface are joined in the transitional curved surface manner.

According to some embodiments, the threshold is 3.5D.

According to some embodiments, both the first curved surface and the second curved surface adjacent to each other are joined in the tangent and continuous manner.

According to some embodiments, the free-form surface is formed by a generatrix revolving along an optical axis. The generatrix is composed of a plurality of first curves and a plurality of second curves. Each first curve has a radius of curvature of the first curved surface and each second curve has a radius of curvature of the second curved surface. The first curves and the second curves are joined in a staggered way in the generatrix. The first curves revolve to form the first curved surface, and the second curves revolve to form the second curved surface.

According to some embodiments, the radius of curvature of the plurality of second curved surfaces is constant or increases in the radial direction of the ring-focus spectacle lens.

According to some embodiments, the second refractive power is greater than the first refractive power by 0.5D to 5D.

According to some embodiments, when the first refractive power is between –2D and 0D, the correction zone bending of the front surface is 401-600 bends.

According to some embodiments, when the first refractive power is –4D to –2D, the correction zone bending of the front surface is 201-400 bends.

According to some embodiments, when the first refractive power is −6D to −4D, the correction zone bending of the front surface is 50-200 bends.

According to some embodiments, the rear surface is spherical, even aspherical or biconical.

According to some embodiments, the plurality of correction zones include a correction central zone and a plurality of correction concentric rings, wherein the correction central zone is located at the center of a ring-focus spectacle lens, and the plurality of astigmatism zones comprise a plurality of astigmatism concentric rings, and the correction concentric rings and the astigmatism concentric rings are arranged in a staggered way.

According to some embodiments, the diameter of the correction central zone is 5-12 mm, the width of the correction concentric ring is 0.5-2 mm, and the width of the astigmatism concentric ring is 0.5-2 mm.

According to some embodiments, the plurality of astigmatism zones have 5-15 astigmatism concentric rings, and the plurality of correction zones include 5-15 correction concentric rings.

According to some embodiments, the central thickness of the ring-focus spectacle lens is 1-3 mm, and the diameter of the ring-focus spectacle lens is 60-80 mm.

Figure 2:
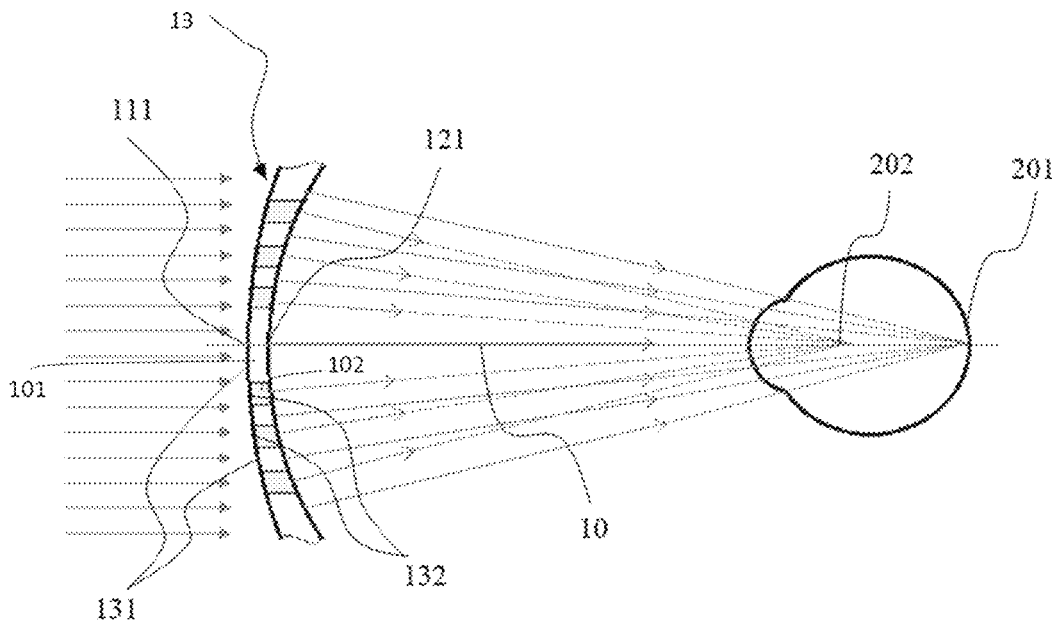
FIG. 2 is an optical effect diagram of a ring-focus spectacle lens according to embodiments of the present invention.

FIGS. 1-5 illustrate a jointless ring-focus spectacle lens for controlling myopia progression according to embodiments of the present invention. As shown in FIGS. 1-2, the ring-focus spectacle lens 1 includes a convex front surface 11 and a concave rear surface 12, a plurality of correction zones 101 and a plurality of astigmatism zones 102. The optical center 111 of the front surface 11 and the optical center 121 of the rear surface 12 are located on a same optical axis 10. The front surface 11 is a free-form surface 13 composed of a plurality of curved surfaces 131 and a plurality of curved surfaces 132. The curved surface 131 has a radius of curvature $R_A$, the curved surface 132 has a radius of curvature $R_B$. $R_A$ is greater than $R_B$. The curved surface 131 and the curved surface 132 are joined in a staggered way in the free-form surface 13. The rear surface 12 may be a spherical surface or an even aspherical or biconical surface. The correction zone 101 is used to provide patients with clear vision, which images light on the retina 201, and has a first refractive power $X_1$ to correct ametropia. The correction zone 101 is defined by at least a curved surface 131. The astigmatism zone 102 is used to provide optical defocus, which images light at a position 202 in front of the retina 201, and has a second refractive power $X_2$ of astigmatism. The astigmatism zone 102 is defined by at least a curved surface 132. In this embodiment, $X_2=X_1+m$, $m \in [0.5D, 5D]$, and $X_2$ is preferably 3.5D. The correction zone 101 and the astigmatism zone 102 are arranged in a staggered way along a radial direction in the ring-focus spectacle lens 1.

Figure 3:
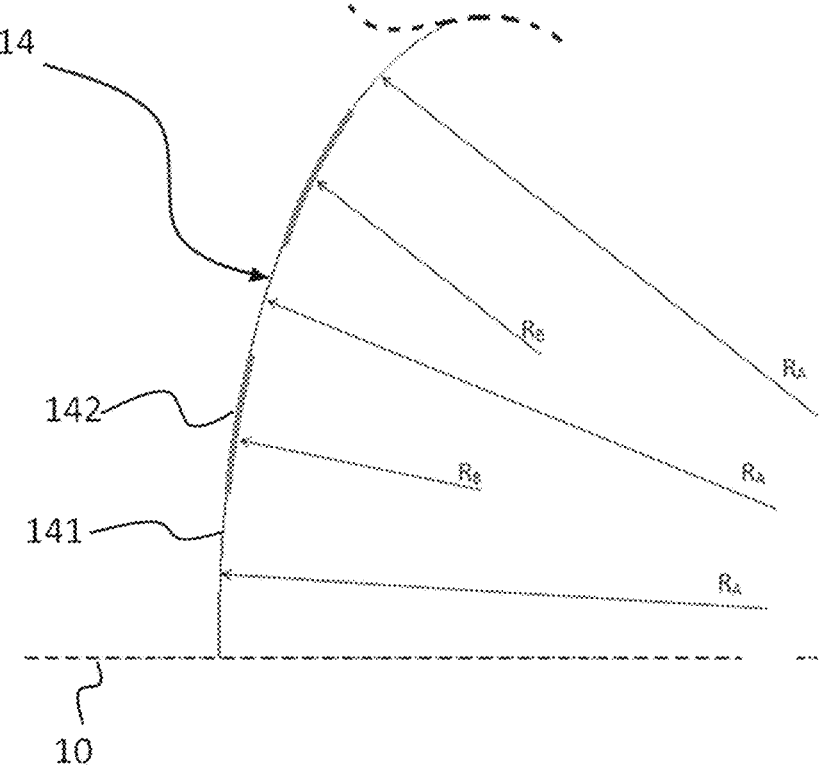
FIG. 3 is a schematic diagram of a generatrix of a free-form surface according to embodiments of the present invention.

As shown in FIG. 3, the free-form surface 13 can be formed by revolving along the optical axis 10 with a smooth curve as the generatrix 14. The generatrix 14 is composed of a plurality of curve 141 with a radius of curvature $R_A$ and a plurality of curve 142 with a radius of curvature $R_B$. Curve 141 and curve 142 are joined in a staggered way in the generatrix 14. Curve 141 revolves to form the curved surface 131, and curve 142 revolves to form the curved surface 132. According to some embodiments, the radius of curvature $R_B$ of the curve 142 is constant or increases in the radial direction of the ring-focus spectacle lens 1.

Figure 4:
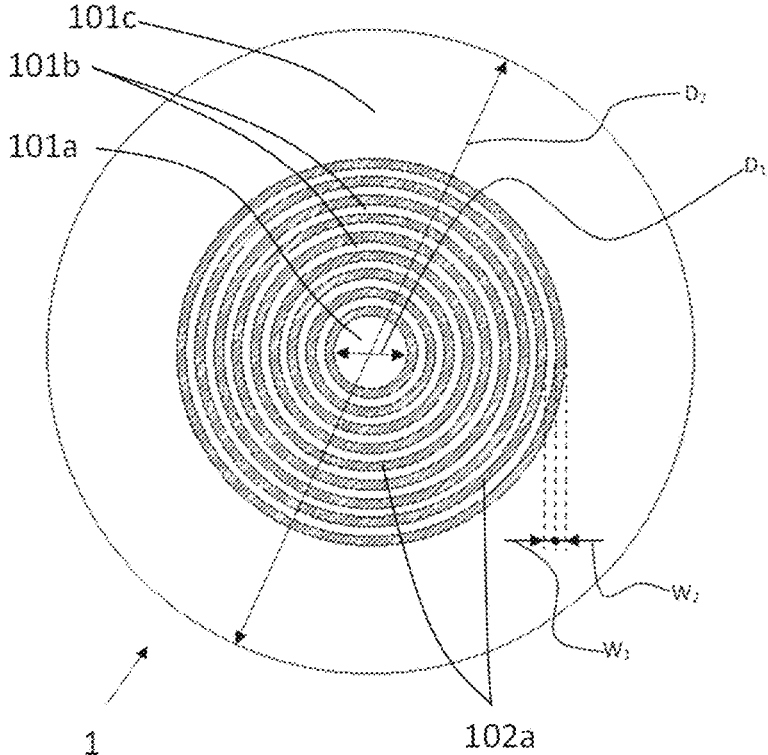
FIG. 4 is a distribution diagram of a correction zone and an astigmatism zone according to embodiments of the present invention.

As shown in FIG. 4, a plurality of correction zones 101 include a correction central zone 101a, a plurality of correction concentric rings 101b and a correction concentric outer ring 101c. The plurality of astigmatism zones 102 comprise a plurality of astigmatism concentric rings 102a. According to this embodiment, the correction central zone 101a is located at the center of the ring-focus spectacle lens 1, and is cylindrical and has a diameter $D_1$, which is preferably 8 mm. The width $W_1$ of the correction concentric ring 101b is preferably 1 mm. The diameter $D_2$ of the ring-focus spectacle lens 1 is preferably 70 mm. The width $W_2$ of the astigmatism concentric ring 102a is preferably 1 mm. The plurality of astigmatism zones 102 preferably includes nine astigmatism concentric rings 102a. The central thickness of the ring-focus spectacle lens 1 is preferably 1.5 mm.

Since the front surface 11 is a free-form surface 13 composed of curved surfaces 131 with $R_A$ and curved surfaces 132 with $R_B$, in order to solve the joint problem when concentric rings with different optical powers (that is, different radiuses of curvature of various rings) are joined, the rings can be joined in a tangent and continuous manner or in a transitional curved surface manner.

In the tangent and continuous manner, the ending point (i.e., the end point) of the curved surface 131 of the nth ring (e.g., the correction concentric ring 101b) and the starting point (i.e., the end point) of the curved surface 132 of the (n+1)th ring (e.g., the astigmatism concentric ring 102a) coincide at the joint point, and the slopes of the tangents of the curved surface 131 and the curved surface 132 are same at the joint point, and at the same time, the extension line of the connecting line connecting the centers of the curved surface 131 and the curved surface 132 passes through the joint point.

In the transitional curved surface manner, a transition curved surface is provided between the nth ring and the (n+1)th ring. The starting point and the ending point of the transition curved surface are respectively joined with the ending point of the nth ring and the starting point of the adjacent (n+1)th ring the directions and values of curvatures of the first curved surface and the transition curved surface are the same at the joint point of the first curved surface and the transition curved surface, and the directions and values of curvatures of the second curved surface and the transition curved surface are the same at the joint point of the second curved surface and the transition curved surface, and the curvatures on the transition curved surface change continuously.

In practical applications, the above-mentioned tangent and continuous manner and transition curved surface manner can be selected to connect adjacent rings (curved surfaces) as needed. For example, the tangent and continuous manner may be chosen for all joining. The transitional curved surface manner may be chosen for all joining. The connection manner may also be chosen according to the diopter difference of the curved surfaces of adjacent rings.

Figure 5A:
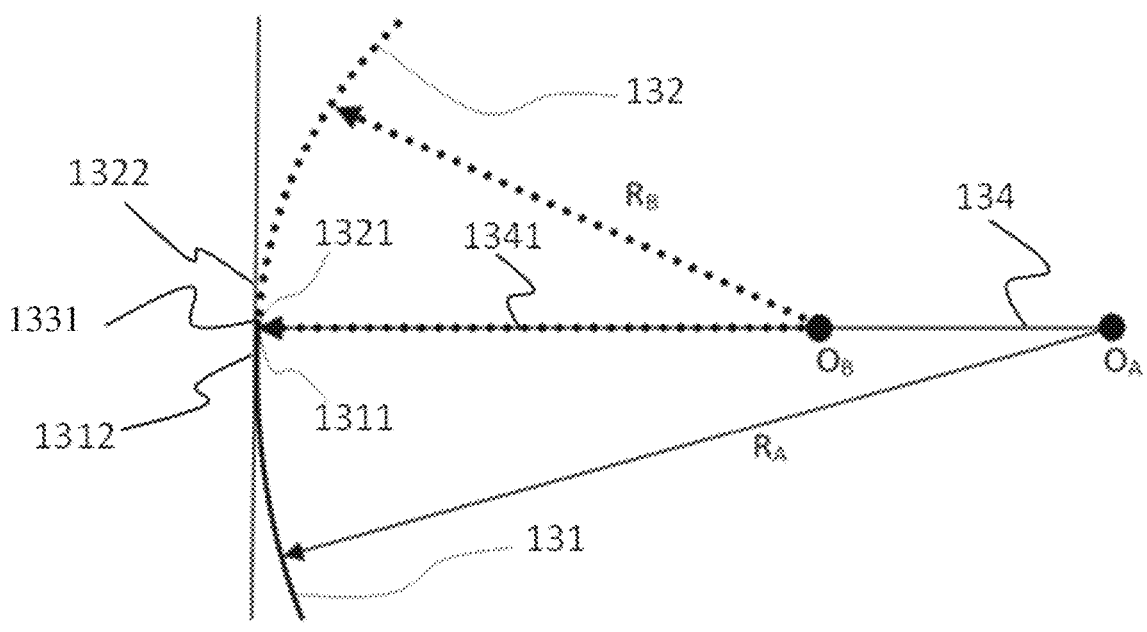
FIG. 5a and FIG. 5b illustrate a method of joining different curved surfaces.

According to one embodiment, from the center of the lens outward along the radial direction, when the diopter of the previous curved surface 131 minus the diopter of the next curved surface 132 is less than or equal to a threshold (for example, 3.5D), the rings are joined in the tangent and continuous manner, such that the ending point (i.e., end point) of the curved surface 131 of the nth ring (e.g., the correction concentric ring 101b) and the starting point (i.e., end point) of the curved surface 132 of the (n+1)th ring (e.g., the astigmatism concentric ring 102a) coincide at the joint point, and the slopes of the tangents of the curved surface 131 and the curved surface 132 are the same at the joint point, and at the same time, an extension line of a connecting line connecting the centers of the curved surface 131 and the curved surface 132 passes through the joint point. As shown in FIG. 5a, the curved surface 131 and the curved surface 132 are tangent and continuous, so that the end point 1311 of the curved surface 131 and the end point 1321 of the curved surface 132 overlap at the joint point 1331, and the tangent line 1312 of the curved surface 131 and the tangent line 1322 of the curved surface 132 have a same slope at the joint point 1331. The extension line 1341 of a connecting line $O_AO_B$ 134 connects the center $O_A$ of the curved surface 131 with the center $O_B$ of the curved surface 132 passes through the joint point 1331, thereby solving the joint problem.

Figure 5B:
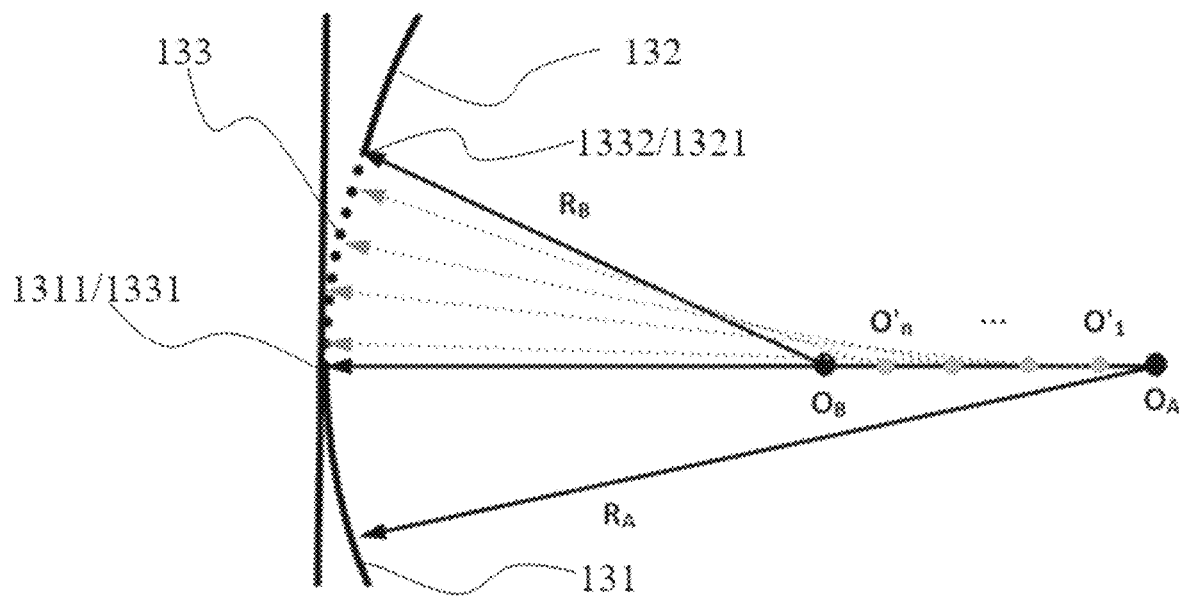

From the center of the lens outward along the radial direction, when the diopter of the previous curved surface 131 minus the diopter of the next curved surface 132 is greater than the aforementioned threshold (for example, 3.5D), the rings are connected in a curvature continuous manner, and there is a transition curved surface 133 between the first curved surface 131 and the second curved surface 132. As shown in FIG. 5b, the ending point 1311 of the first curved surface 131 and the starting point of the transition curved surface 133 coincide, and at this point, the curvature and direction of both are the same. Similarly, the starting point 1321 of the second curved surface 132 and the ending point 1332 of the transition curved surface coincide, and at this point, the curvature and direction of both are same. On the transition curved surface 133, the curvatures change continuously from $R_A$ to $R_B$.

Further coming to manufacturing, the present invention provides a production method in which the anterior and posterior molds cooperate with each other to form lenses with different correction degrees, which greatly reduces the number of mold cores, thereby reducing the production cost.

Some embodiments of the present invention disclose a method for manufacturing a series of the ring-focus spectacle lenses. The series of the ring-focus spectacle lenses include a first set of ring-focus spectacle lenses with different myopia degree and astigmatism degree, a second set of ring-focus spectacle lenses with different myopia degree and astigmatism degree, a third set of ring-focus spectacle lenses with different myopia degree and astigmatism degree, and a fourth set of ring-focus spectacle lenses with different myopia degree and astigmatism degree, wherein the myopia degree of the first set of ring-focus spectacle lenses is smaller than that of the second set of ring-focus spectacle lenses, the myopia degree of the second set of ring-focus spectacle lenses is smaller than that of the third set of ring-focus spectacle lenses, and the myopia degree of the third set of ring-focus spectacle lenses is smaller than that of the fourth set of ring-focus spectacle lenses, the method comprising the following steps:

providing a first anterior mold core for generating a front surface with a first correction zone bending;

providing a second anterior mold core for generating a front surface with a second correction zone bending, wherein the first correction zone bending is greater than the second correction zone bending;

providing a third anterior mold core for generating a front surface with a third correction zone bending, wherein the second correction zone bending is greater than the third correction zone bending;

providing a set of posterior mold cores for generating rear surfaces with different radius of curvature, the set of posterior mold cores comprising a plurality of posterior mold cores, and each posterior mold core being used for generating rear surfaces with corresponding radius of curvature;

providing a planar posterior mold core for generating a planar rear surface;

using the first anterior mold core and the set of posterior mold cores to generate the first set of ring-focus spectacle lenses;

using the second anterior mold core and the set of posterior mold cores to generate the second set of ring-focus spectacle lenses;

using the third anterior mold core and the set of posterior mold cores to generate the third set of ring-focus spectacle lenses;

using the third anterior mold core and the planar posterior mold core to generate a semi-finished lens; and processing the rear surface of the semi-finished lens to generate the fourth set of ring-focus spectacle lenses.

According to some embodiments, the first set of ring-focus spectacle lenses have spectacle lenses with a first refractive power of −2D to 0D, the second set of ring-focus spectacle lenses have spectacle lenses with a first refractive power of −4D to −2D, the third set of ring-focus spectacle lenses have spectacle lenses with a first refractive power of −6D to −4D, and the fourth set of ring-focus spectacle lenses have spectacle lenses with a first refractive power of less than −6D.

According to some embodiments, the first correction zone bending is 401-600 bends, the second correction zone bending is 201-400 bends, and the third correction zone bending is 50-200 bends.

According to some embodiments, the set of posterior mold cores have 80 to 120 posterior mold cores.

According to some embodiments, the central thickness of the semi-finished lens is 2-20 mm.

Figure 6:
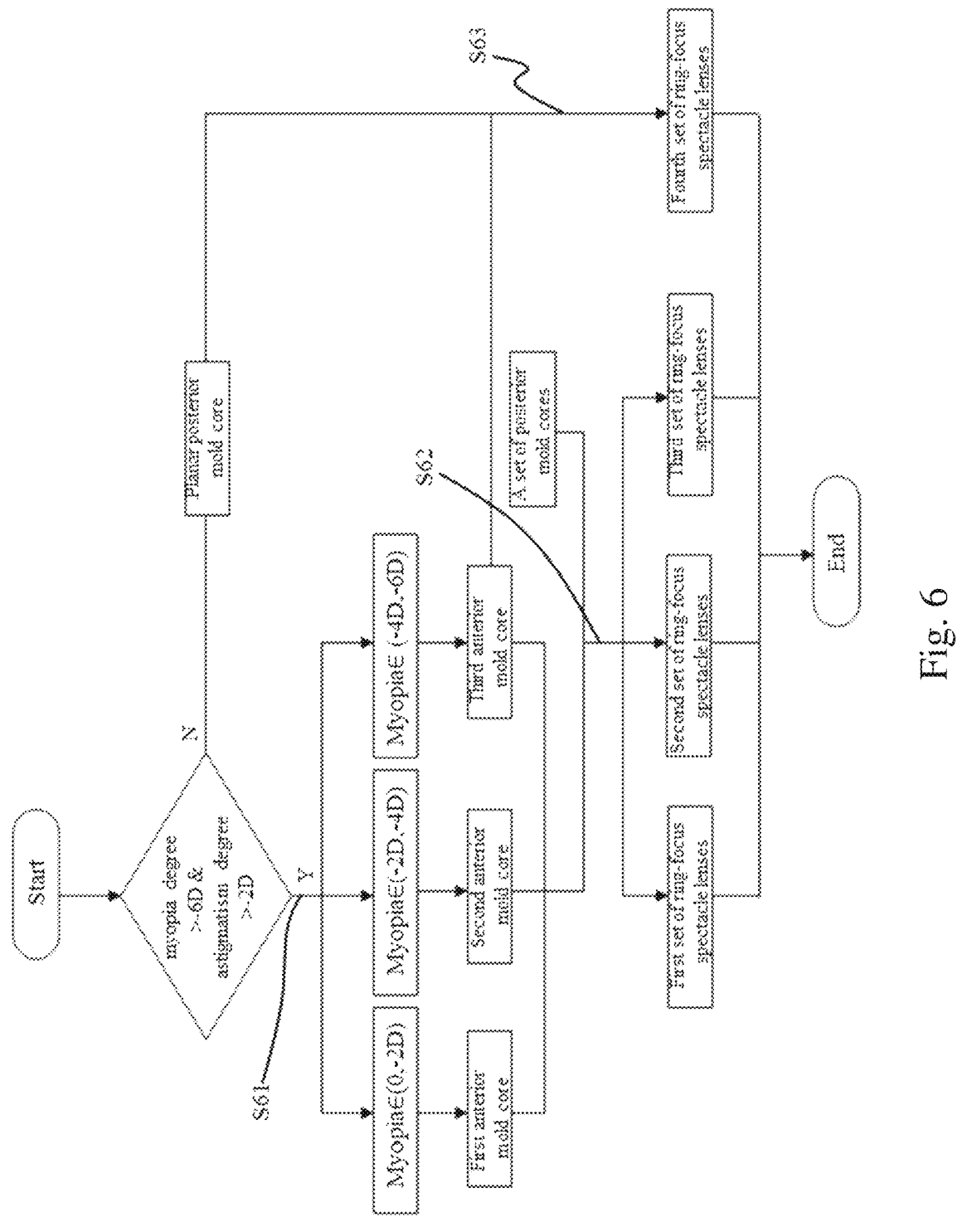
FIG. 6 is a flowchart of a method for manufacturing a series of ring-focus spectacle lenses according to embodiments of the present invention.

FIG. 6 is a flowchart of a method for manufacturing a series of ring-focus spectacle lenses according to embodiments of the present invention. This series of ring-focus spectacle lenses includes multiple sets of ring-focus spectacle lenses with different myopia degree and astigmatism degree. When the myopia degree is greater than −6D and the astigmatism degree is greater than −2D, according to step S61, there are provided a first anterior mold core for generating a first set of ring-focus spectacle lenses with myopia degree of 0 to −2D, a second anterior mold core for generating a second set of ring-focus spectacle lenses with myopia degree of −2D to −4D, a third anterior mold core for generating a third set of ring-focus spectacle lenses with myopia degree of −4D to −6D, and a set of posterior mold cores for generating rear surfaces with different radius of curvature. The first anterior mold core is used to generate a front surface with a first correction zone bending, the second anterior mold core is used to generate a front surface with a second correction zone bending, and the third anterior mold core is used to generate a front surface with a third correction zone bending. The first correction zone bending is greater than the second correction zone bending, and the second correction zone bending is greater than the third correction zone bending. This set of posterior mold cores comprises a plurality of posterior mold cores, and each posterior mold core is used for generating a rear surface with a corresponding radius of curvature.

According to step S62, the first anterior mold core and the set of posterior mold cores are used to generate a first set of ring-focus spectacle lenses, the second anterior mold core and the set of posterior mold cores are used to generate a second set of ring-focus spectacle lenses, and the third anterior mold core and the set of posterior mold cores are used to generate a third set of ring-focus spectacle lenses.

When the myopia degree is less than −6D and the astigmatism degree is less than −2D, according to step S63, a planar posterior mold core for generating a fourth set of ring-focus spectacle lenses with myopia degree less than −6D and astigmatism degree less than −2D is provided for generating a planar rear surface. A third anterior mold core and a planar posterior mold core are used to generate a semi-finished lens having a front surface with a third correction zone bending and a planar rear surface, and the rear surface of the semi-finished lens is processed to generate a fourth set of ring-focus spectacle lenses. The first set of ring-focus spectacle lenses, the second set of ring-focus spectacle lenses, the third set of ring-focus spectacle lenses and the fourth set of ring-focus spectacle lenses do not overlap in myopia degree and astigmatism degree.

Figure 7:
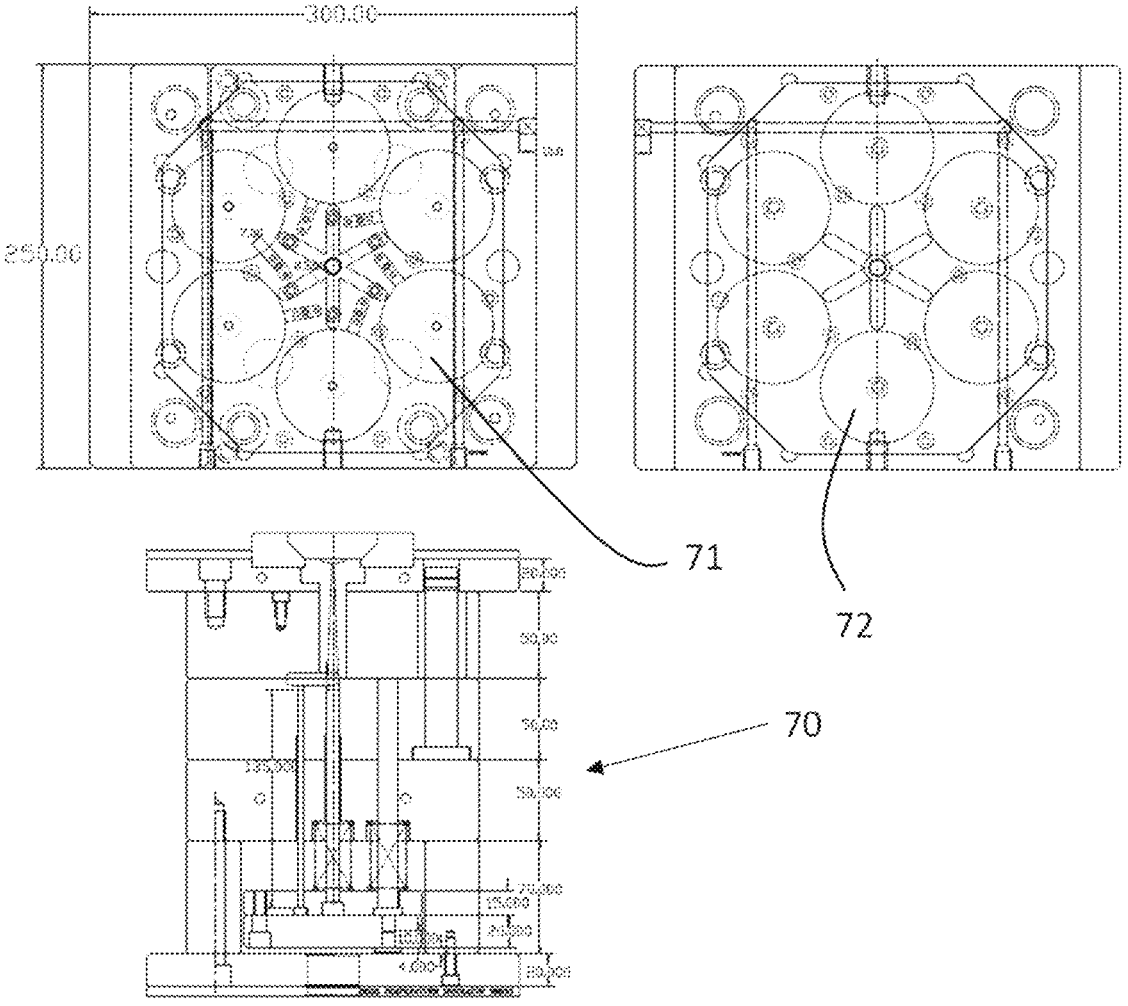
FIG. 7 is a structural diagram of a mold according to embodiments of the present invention.
Figure 8:
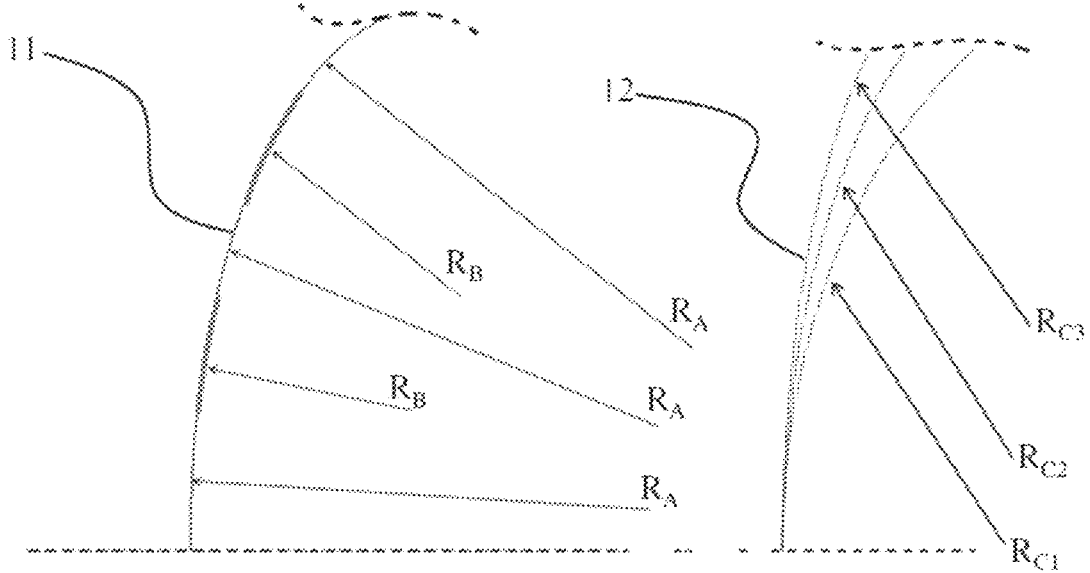
FIG. 8 is a schematic diagram of the front surface and the rear surface cooperating with each other according to embodiments of the present invention.

FIG. 7 is a structural diagram of a mold 70 according to embodiments of the present invention. The mold 70 includes an anterior mold core 71 and a posterior mold core 72. In this embodiment, as shown in FIG. 8, when the first refractive power $X_1$ of the ring-focus spectacle lens 1 meets $X_1 \in [-2D, 0D]$, the correction zone bending of the front surface is preferably 500 bends, and all myopia degrees and astigmatism degrees are completed by the matched rear surfaces 12($R_{C1}$, $R_{C2}$, $R_{C3}$, . . . ). In this embodiment, the correction zone bending can be calculated by the following empirical formula: correction zone bending=(0.532/$R_A$) ×100, and the unit of $R_A$ is meter, but the correction zone bending can also be calculated by other related formulas in the field. When $X_1 \in [-4D, -2D]$, the correction zone bending is preferably 300 bends, and all myopia degrees and astigmatism degrees are also completed by the matched rear surfaces 12($R_{C1}$, $R_{C2}$, $R_{C3}$, . . . ). When $X1 \in [-6D, -4D]$, the correction zone bending is preferably 100 bends, and all myopia degrees and astigmatism degrees are also completed by the matched rear surfaces 12($R_{C1}$, $R_{C2}$, $R_{C3}$, . . . ). That is, the mold of the whole spectacle lens series includes three anterior mold cores 61 for generating the front surface 11 with three different free-form surfaces, and a set of posterior mold cores 62 for generating the rear surface 12, both of which can be matched with each other to completely manufacture most of the whole series. Since the whole set of molds does not need an independent set of mold cores for each degree, this method greatly reduces the number of mold cores for the front and rear surfaces and reduces the production cost.

According to some embodiments, the correction zone bending of the front surface is 500 bends, and when matched with a rear surface with a radius of curvature of 104.5819, a lens with a flat correction zone can be formed, and when matched with a rear surface with a curvature radius of 82.6233, a myopia lens with a correction zone of −1.5D can be formed. When the correction zone bending of the front surface is 300 bends, a myopia lens with a correction zone of −2.25D can be formed when the rear surface with a curvature radius of 104.5819 is matched, and a myopia lens with a correction zone of −3.75 D can be formed when the rear surface with a curvature radius of 82.6233 is matched. Similarly, when the correction zone bending of the front surface is 100 bends, a myopia lens with a correction zone of −4.5D can be formed when the rear surface with a curvature radius of 104.5819 is matched, and a myopia lens with a correction zone of −6D can be formed when the rear surface with a curvature radius of 82.6233 is matched.

When myopia degree <−6D or astigmatism degree <−2D is needed, a 100-bend anterior mold and a planar posterior mold are used, and the central thickness is preferably 8 mm, so as to make a semi-finished lens with a front surface of 100-bend correction zone and a planar rear surface, and then this semi-finished lens is subjected to secondary processing to generate a ring-focus spectacle lens with myopia degree <−6D or astigmatism degree <−2D. This is because there is less demand for this kind of lenses, and it is not cost-effective to produce them with molds. The semi-finished products can reduce the number and inventory of mold cores, thereby reducing the cost.

Figure 9:
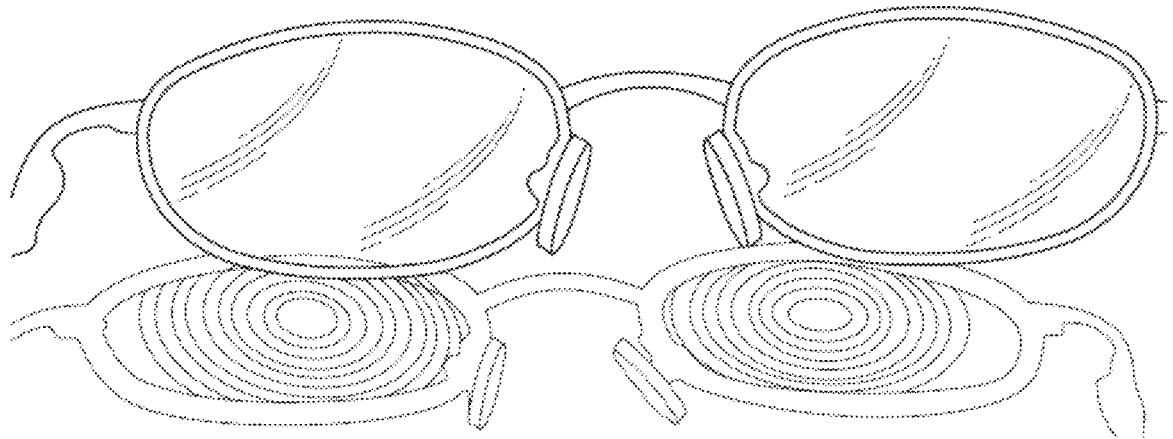
FIG. 9 is a real shot view of a ring-focus spectacle lens according to embodiments of the present invention.

FIG. 9 is a real shot view of a ring-focus spectacle lens according to embodiments of the present invention, which can clearly illustrate that there is no joint on the surface of the lens. In the projection of the lens under light, it can be seen that the correction zone and the astigmatism zone have obviously different optical powers, which fully verifies the correctness and feasibility of the present invention.

Compared with the prior art, the present invention has the following significant advantages:

1. The present invention provides a manufacturing-oriented jointless ring-focus spectacle lens design technology for controlling myopia progression, and a continuous design of concentric rings with different optical powers of the front surface. Its appearance is consistent with that of ordinary lenses and has no joint, and it has an aesthetic appearance.

2. The correction zones and astigmatism zones are arranged in a staggered way to reduce the peeling of peripheral vision caused by optical defocus.

3. The manufacturing-oriented method uses three anterior mold cores, a set of posterior mold cores and a planar posterior mold core to manufacture a series of lenses with complete degrees, which greatly reduces the number of mold cores and production cost.

4. The optimized refractive power distribution not only provides patients with clear vision, but also ensures that patients can receive positive optical defocus signals, thereby to inhibit eyeball elongation and improve vision.

Although the specific implementations of the present invention have been described above, those skilled in the art should understand that these are only examples, and some changes and modifications may be made to these implementations without departing from the principle and essence of the present invention. Therefore, the protection scope of the present invention is defined by the appended claims.

The invention claimed is:

1. A ring-focus spectacle lens for controlling myopia progression, the ring-focus spectacle lens comprising a convex front surface, a concave rear surface, a plurality of correction zones for imaging light on a retina, and a plurality of astigmatism zones for imaging light in front of the retina, optical centers of the front surface and the rear surface being located on a same optical axis, the correction zones having a first refractive power and the astigmatism zones having a second refractive power that is greater than the first refractive power, the correction zones and the astigmatism zones being arranged in a staggered way in the ring-focus spectacle lens, wherein the front surface comprises a free-form surface composed of a plurality of first curved surfaces and a plurality of second curved surfaces, the plurality of first curved surfaces having a same radius of curvature, the plurality of second curved surfaces having a same or different radius of curvature, the radius of curvature of the first curved surfaces being greater than the radius of curvature of the second curved surfaces, the first curved surfaces and the second curved surfaces being joined in a staggered way in the free-form surface, the correction zones being defined at least by the first curved surfaces, and the astigmatism zones being defined at least by the second curved surfaces;

wherein a first curved surface and an adjacent second curved surface are joined in a tangent and continuous manner or a transitional curved surface manner, for the tangent and continuous manner, the first curved surface and the adjacent second curved surface are tangent and continuous, such that an endpoint of the first curved surface and an endpoint of the second curved surface coincide at the joint point, and a tangent of the first curved surface and a tangent of the second curved surface have a same slope at the joint point, and an extension line of a connecting line connecting a center of the first curved surface and a center of the second curved surface passes through the joint point, for the transitional curved surface manner, a transition curved surface is provided between the first curved surface and the adjacent second curved surface, a starting point and an ending point of the transition curved surface being respectively joined with an ending point of the first curved surface and a starting point of the adjacent second curved surface, directions and values of curvatures of the first curved surface and the transition curved surface being same at a joint point of the first curved surface and the transition curved surface, and directions and values of curvatures of the second curved surface and the transition curved surface being the same at a joint point of the second curved surface and the transition curved surface, curvatures on the transition curved surface changing continuously.

2. The ring-focus spectacle lens according to claim 1, wherein from a center of the lens outward in a radial direction, when a diopter of a previous curved surface minus a diopter of a subsequent curved surface is less than or equal to a threshold, the previous curved surface and the subsequent curved surface are joined in the tangent and continuous manner, and when the diopter of the previous curved surface minus the diopter of the subsequent curved surface is greater than a threshold, the previous curved surface and the subsequent curved surface are joined in the transitional curved surface manner.

3. The ring-focus spectacle lens according to claim 2, wherein the threshold is 3.5D.

4. The ring-focus spectacle lens according to claim 1, wherein all first curved surfaces and second curved surfaces adjacent to each other are joined in the tangent and continuous manner.

5. The ring-focus spectacle lens according to claim 1, wherein the free-form surface is formed by a generatrix revolving along the optical axis, and the generatrix is composed of a plurality of first curves and a plurality of second curves, each first curve having a radius of curvature of the first curved surface and each second curve having a radius of curvature of the second curved surface, the first curves and the second curves being joined in a staggered way in the generatrix, the first curves revolving to form the first curved surface, the second curves revolving to form the second curved surface.

6. The ring-focus spectacle lens according to claim 5, wherein the generatrix is a continuous and smooth curve without protrusion or depression.

7. The ring-focus spectacle lens according to claim 1, wherein the radius of curvature of the plurality of second curved surfaces is constant or increases in a radial direction of the ring-focus lens.

8. The ring-focus spectacle lens according to claim 1, wherein the second refractive power is greater than the first refractive power by 0.5D to 5D.

9. The ring-focus spectacle lens according to claim 1, wherein when the first refractive power is between –2D and 0D, a correction zone bending of the front surface is 401-600 bends.

10. The ring-focus spectacle lens according to claim 1, wherein when the first refractive power is between –4D and –2D, a correction zone bending of the front surface is 201-400 bends.

11. The spectacle lens according to claim 1, wherein when the first refractive power is between –6D and –4D, a correction zone bending of the front surface is 50-200 bends.

12. The ring-focus spectacle lens according to claim 1, wherein the rear surface is a spherical surface, an even aspheric surface or a biconical surface.

13. The ring-focus spectacle lens according to claim 1, wherein the plurality of correction zones comprise a correction central zone and a plurality of correction concentric rings, wherein the correction central zone is located at a center of the lens, and the plurality of astigmatism zones comprise a plurality of astigmatism concentric rings, and the correction concentric rings and the astigmatism concentric rings are arranged in a staggered way.

14. The ring-focus spectacle lens according to claim 13, wherein a diameter of the correction central zone is 5-12 mm, a width of a correction concentric ring is 0.5-2 mm, and a width of an astigmatism concentric ring is 0.5-2 mm.

15. The ring-focus spectacle lens according to claim 13, wherein the plurality of astigmatism zones have 5-15 astigmatism concentric rings, and the plurality of correction zones include 5-15 correction concentric rings.

16. The ring-focus spectacle lens according to claim 1, wherein a central thickness of the ring-focus spectacle lens is 1-3 mm, and a diameter of the ring-focus spectacle lens is 60-80 mm.

17. A method for manufacturing a series of ring-focus spectacle lenses according to claim 1, the series of the ring-focus spectacle lenses comprising a first set of ring-focus spectacle lenses with different myopia degree and astigmatism degree, a second set of ring-focus spectacle lenses with different myopia degree and astigmatism degree, a third set of ring-focus spectacle lenses with different myopia degree and astigmatism degree, and a fourth set of ring-focus spectacle lenses with different myopia degree and astigmatism degree, the myopia degree of the first set of ring-focus spectacle lenses being smaller than that of the second set of ring-focus spectacle lenses, the myopia degree of the second set of ring-focus spectacle lenses being smaller than that of the third set of ring-focus spectacle lenses, and the myopia degree of the third set of ring-focus spectacle lenses being smaller than that of the fourth set of ring-focus spectacle lenses, the method comprising:

providing a first anterior mold core for generating a front surface with a first correction zone bending;

providing a second anterior mold core for generating a front surface with a second correction zone bending, wherein the first correction zone bending is greater than the second correction zone bending;

providing a third anterior mold core for generating a front surface with a third correction zone bending, wherein the second correction zone bending is greater than the third correction zone bending;

providing a set of posterior mold cores for generating a rear surface with different radius of curvature, the set of posterior mold cores comprising a plurality of posterior mold cores, each posterior mold core being used for generating a rear surface with a respective radius of curvature;

providing a planar posterior mold core for generating a planar rear surface;

using the first anterior mold core and the set of posterior mold cores to generate the first set of ring-focus spectacle lenses;

using the second anterior mold core and the set of posterior mold cores to generate the second set of ring-focus spectacle lenses;

using the third anterior mold core and the set of posterior mold cores to generate the third set of ring-focus spectacle lenses;

using the third anterior mold core and the planar posterior mold core to generate a semi-finished lens; and processing the rear surface of the semi-finished lens to generate the fourth set of ring-focus spectacle lenses.

18. The method according to claim 17, wherein the first set of ring-focus spectacle lenses have ring-focus spectacle lenses with a first refractive power of −2D to 0D, the second set of ring-focus spectacle lenses have ring-focus spectacle lenses with a first refractive power of −4D to −2D, the third set of ring-focus spectacle lenses have ring-focus spectacle lenses with a first refractive power of −6D to −4D, and the fourth set of ring-focus spectacle lenses have ring-focus spectacle lenses with a first refractive power of less than −6D or an astigmatism degree less than −2D.

19. The method according to claim 17, wherein the first correction zone bending is 401-600 bends, the second correction zone bending is 201-400 bends, and the third correction zone bending is 50-200 bends.

20. The method according to claim 17, wherein the set of posterior mold cores have 80 to 120 posterior mold cores.

21. The method according to claim 17, wherein a central thickness of the semi-finished lens is 2-20 mm.

\* \* \* \* \*